United States Patent [19]

Inui et al.

[11] Patent Number: 4,952,944

[45] Date of Patent: Aug. 28, 1990

[54] TRANSFER RECORDER WITH HEATER

[75] Inventors: Toshiharu Inui; Noriyoshi Ishikawa, both of Yokohama, Japan

[73] Assignee: Canon Kabushiki Kaisha, Tokyo, Japan

[21] Appl. No.: 250,096

[22] Filed: Sep. 28, 1988

[30] Foreign Application Priority Data

Oct. 1, 1987 [JP] Japan ................................ 62-245811

[51] Int. Cl.[5] ......................... G01D 15/10; B41J 2/325

[52] U.S. Cl. .................................. 346/25; 346/76 PH; 346/108; 355/284

[58] Field of Search ............ 346/25, 108, 160, 76 PH, 346/1.1; 355/284, 290

[56] References Cited

U.S. PATENT DOCUMENTS 4,661,703 4/1987 Ishikawa ........................ 346/76 PH
4,814,793 3/1989 Hamada ............................. 346/108

FOREIGN PATENT DOCUMENTS 0205083 12/1986 European Pat. Off. .
2113860 8/1983 United Kingdom .

*Primary Examiner*—Mark J. Reinhart
*Attorney, Agent, or Firm*—Fitzpatrick, Cella, Harper & Scinto

[57] ABSTRACT

An image recording apparatus for effecting the recording of an image on a recording medium has conveying member for conveying a transfer recording medium having a transfer recording layer whose transfer characteristic is varied by first energy and second energy differing from the first energy being imparted thereto, a recording section having first energy imparting member for imparting the first energy to the transfer recording medium and second energy imparting member for imparting the second energy to the transfer recording medium, the first and second energy imparting member being provided along the conveyance path of the transfer recording medium conveyed by the conveying member, a transfer section for transferring an image formed on the transfer recording medium in the recording section to the recording medium, and heater provided upstream of the recording section with respect to the direction of conveyance of the transfer recording medium for imparting heat energy to the transfer recording medium.

10 Claims, 10 Drawing Sheets

TRANSFER RECORDER WITH HEATER

BACKGROUND OF THE INVENTION

1. Field of the Invention

This invention relates to an image recording method and apparatus for effecting the recording of an image on a recording medium. The term "image recording apparatus" covers a printer apparatus, a copying apparatus, an electronic typewriter and the like.

2. Related Background Art

In recent years, with the rapid development of the information industry, various information processing systems have been developed and image recording apparatuses suitable for the respective information processing systems have also been developed.

One of such image recording apparatuses is a thermosensitive transfer recording apparatus. This apparatus effects recording on a recording sheet by the use of an ink ribbon comprising a ribbon-like back-up member having applied thereto heat-meltable ink consisting of a coloring agent dispersed in a heat-meltable binder.

That is, said ink ribbon is superposed on the recording sheet so that the heat-meltable ink layer thereof contacts with the recording sheet, and the ink ribbon and the recording sheet are conveyed to between a thermal head and a platen, and pulse-like heat conforming to an image signal is applied from the back-up member side of said ink ribbon by the thermal head while, at the same time, the two are urged against each other to transfer the molten ink to the recording sheet, whereby an ink image corresponding to the application of heat is recorded on the recording sheet.

The above-described image recording apparatus has been widely used in recent years for its small size and light weight and noiselessness and its capability of recording images on plain paper.

However, the conventional thermosensitive transfer recording apparatus is not without a problem.

The problem is that in the conventional thermosensitive transfer recording apparatus, the transfer recording property, i.e., the quality of image, is greatly affected by the degree of surface smoothness of the recording sheet and the quality of image recording may be deteriorated in the case of a recording sheet having a low degree of smoothness although good image recording can be accomplished on a recording sheet having a high degree of smoothness.

Also, in the conventional thermosensitive transfer recording apparatus, when it is desired to obtain a polychromatic image, it is necessary to repeat transfer and superpose colors one upon another. Therefore, a plurality of thermal heads must be provided in the apparatus or the recording sheet must be subjected to complicated movements such as stoppage and backward feeding, and this leads to the problem that not only color misregistration is unavoidable, but also the entire apparatus becomes bulky and complex.

So, the applicant has invented an image recording method and a transfer recording medium which solve the problem peculiar to the aforedescribed conventional image forming apparatus and which are capable of recording images of high quality even on a recording medium having a low degree of surface smoothness and which, when applied for polychromatic recording, can provide a polychromatic image without causing the recording medium to effect complicated movements. The applicant filed patent applications in Japan by Japanese Patent Application No. 60-120080 (filed on June 3, 1985), Japanese Patent Application No. 60-120081 (filed on June 3, 1985), Japanese Patent Application No. 60-131411 (filed on June 17 1985), Japanese Patent Application No. 60-134831 (filed on June 20, 1985), Japanese Patent Application No. 60-150597 (filed on July 9, 1985), Japanese Patent Application No. 60-199926 (filed on Sept. 10, 1985) and Japanese Patent Application No. 60-250884 (filed on Nov. 11, 1985) Further, claiming the priority based on these Japanese patent applications, the applicant filed a U.S. application (Application No. 869,689 filed in U.S. on June 2, 1986) and an European application (Application No. 86107540.6, filed in Europe on June 3, 1986).

The present invention which will hereinafter be described is a further development over the aforementioned inventions covered by the Japanese applications, the U.S. application and the European application filed by the applicant. The present invention which will hereinafter be described permits suitable application of the image recording method and apparatus and the transfer recording medium made clear in the specifications of the aforementioned applications.

SUMMARY OF THE INVENTION

It is an object of the present invention to provide an image recording method and apparatus which can accomplish stable image recording without being affected by the environment in which image recording is effected.

It is another object of the present invention to provide an image recording method and apparatus which can accomplish stable image recording by heating a transfer recording medium prior to an image being formed on said transfer recording medium.

I is still another object of the present invention to provide an image recording method and apparatus which can form images of high quality even on a recording medium having a low degree of surface smoothness (for example, plain paper or the like having a rough surface).

It is yet still another object of the present invention to provide an image recording method and apparatus capable of high-speed recording.

It is a further object of the present invention to provide an image recording method and apparatus which can obtain polychromatic or full-colored images without causing a transfer recording medium or a recording medium to effect complicated movements.

It is still a further object of the present invention to provide an image recording method and apparatus which can accomplish the formation of an image on a transfer recording medium and the transfer of this image to a recording medium in discrete steps.

BRIEF DESCRIPTION OF THE DRAWINGS

FIG. 12 illustrates a temperature control system for a transfer roller 4a.

DESCRIPTION OF THE PREFERRED EMBODIMENT

The image recording method and apparatus of the present invention will hereinafter be described with reference to the drawings.

The embodiment which will hereinafter be described is an image recording method and apparatus characterized in that prior to forming an image on a transfer recording medium having a transfer recording layer whose transfer characteristic is varied by a plurality of kinds of energy being imparted thereto, heat energy is imparted to said transfer recording medium in conformity with the environment or the like in which the apparatus is used.

Figure 1A:
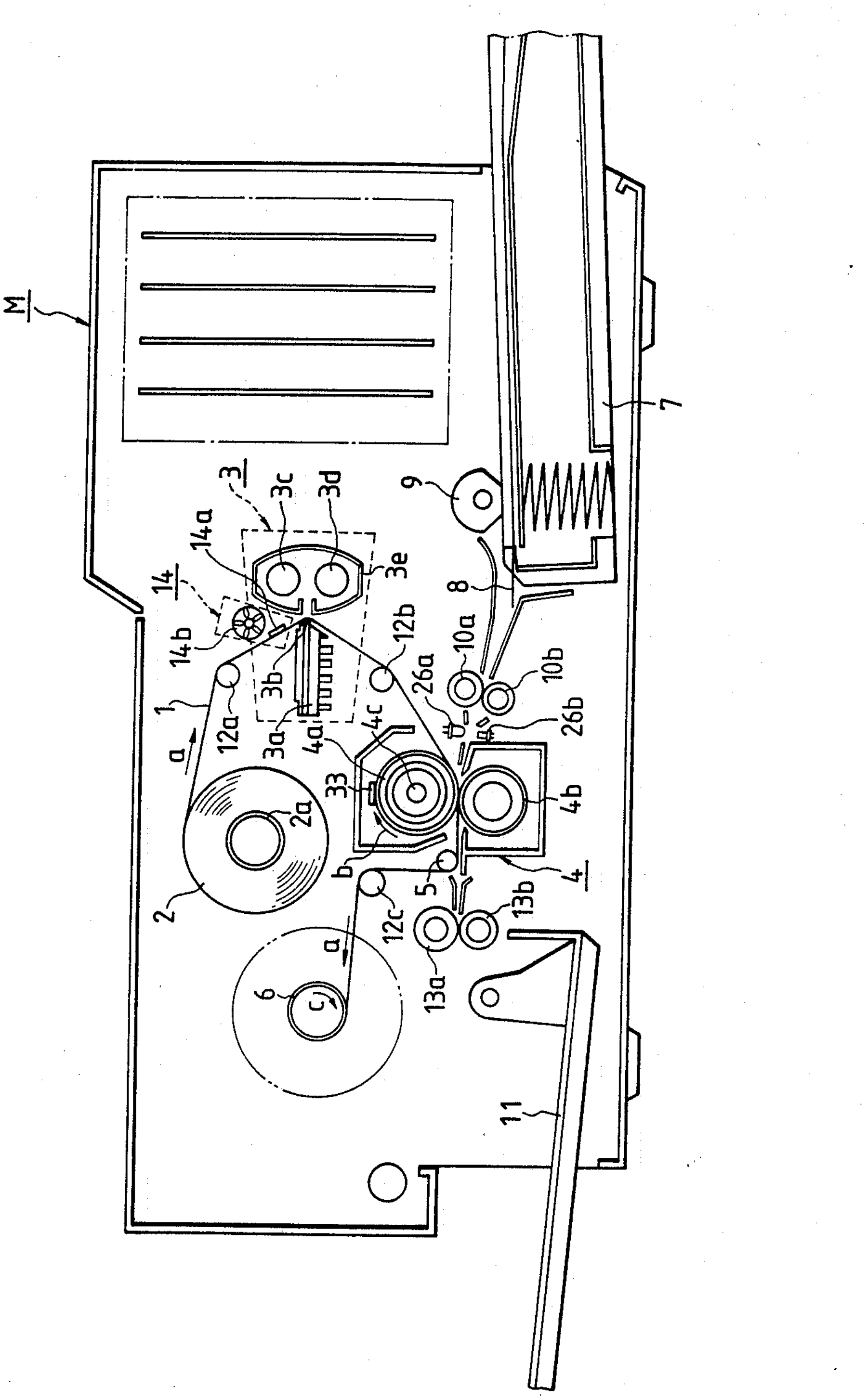
FIGS. 1A and 1B are general schematic illustrations of embodiment of the present invention.
Figure 1B:
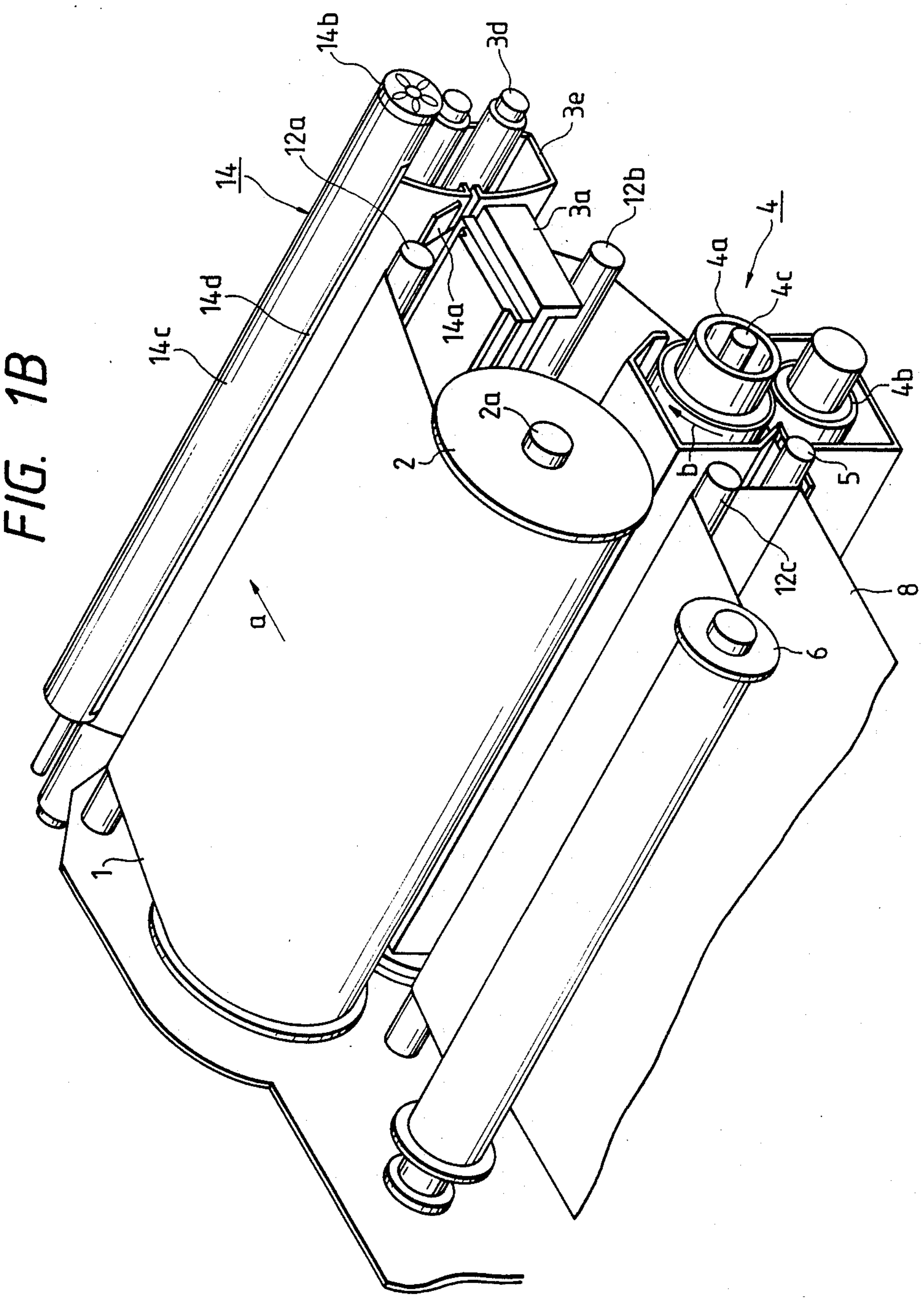
Figure 1C:
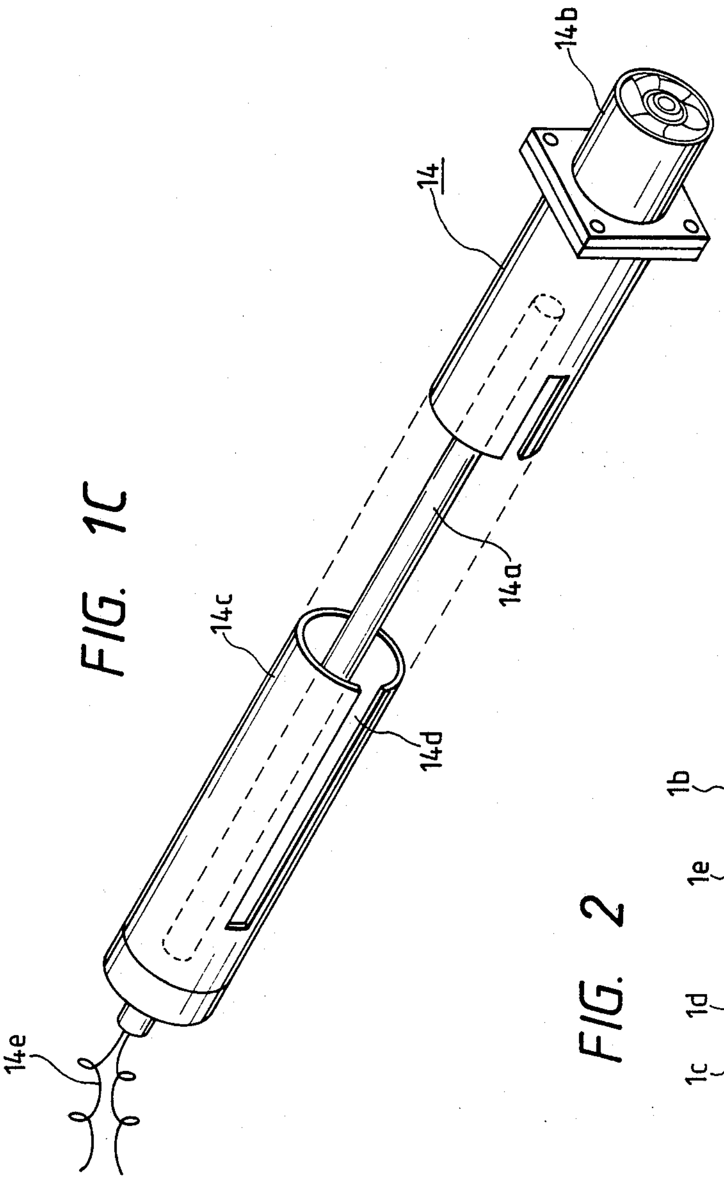
FIG. 1C is a perspective view of an embodiment of heating mean to the present invention.

FIG. 1A is a schematic cross-sectional illustration of an image recording apparatus to which an embodiment of the present invention is applied, FIG. 1B is a perspective illustration of the apparatus, and FIG. 1C is a perspective view of an embodiment of heating means applicable to the present invention.

In these figures, the reference numeral 1 designates a long sheet-like transfer recording medium which is wound into the form of a roll and removably incorporated as a supply roll 2 in an apparatus body M. That is, this supply roll 2 is removably loaded on a rotatable shaft 2a provided in the apparatus body M.

The leading end of the transfer recording medium 1 is first changed in direction by a peeling-off roller 5 and a guide roller 12c from between a transfer roller 4a and a pressing roller 4b via the supply roll 2, a guide roller 12a heating means 14, a recording head 3a and a guide roller 12b and is caused to arrive at a take-up roll 6, and that leading end is restrained on the take-up roll 6 by means such as a gripper (not shown). Thereafter, the transfer roller 4a is rotated while a torque is imparted in the direction of arrow c to the take-up roll 6 by conventional drive means, whereby the transfer recording medium is paid away in the direction of arrow a and is sequentially taken up onto the peripheral surface of the take-up roll 6.

During the take-up of the transfer recording medium, predetermined back tension is imparted to the supply roll 2, for example, by a hysteresis brake (not shown), and by this tension and the guide rollers 12a and 12b, the transfer recording medium 1 may be conveyed while being urged against the recording head 3a under a predetermined pressure and at a predetermined angle.

The constructions of said various portions will now be described in detail.

Figure 2:
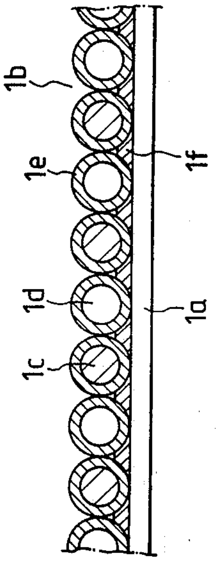
FIG. 2 illustrates the construction of a transfer recording medium.

The transfer recording medium 1, as shown in FIG. 2, comprises a sheet-like back-up member 1a and a transfer recording layer 1b attached thereto and having a property capable of forming images thereon when heat energy and light energy are both imparted thereto.

Describing an example of the transfer recording medium, as shown in FIG. 2, the transfer recording layer 1b is constructed by using components shown in Tables 1 and 2 below as cores 1c and 1d and forming microcapsule-like image forming nuclides by a method shown below.

TABLE 1

| Item | Component | Weight |
|---|---|---|
| Polymeric prepolymer | $(CH_2 = CHCOOCH_2.CH_2.O.CO.NH-\langle H \rangle-)_2-CH_2$ | 68 |
| Light starting agent | Irgacure-184 (produced by Chiba Gaigee Co., Ltd.) ethyl-p-dimethylaminobenzoate | 2/2 |
| Binder | Elvasite 2041 (produced by Du Pont, Inc.) | 23 |
| Coloring agent | Sumitoncarmin (produced by Sumitomo Kagaku Kogyo, Co., Ltd.) | 5 |

TABLE 2

| Item | Component | Weight % |
|---|---|---|
| Polymeric prepolymer | $(CH_2 = CHCOOCH_2.CH_2.O.CO.NH-\langle H \rangle-)_2-CH_2$ | 68 |
| Light starting agent | 2-chlorothioxanthon ethyl-p-dimethylaminobenzoate | 1.4/2 |
| Binder | Elvasite 2041 (produced by Du Pont, Inc.) | 23.6 |
| Coloring agent | Lionel Blue-FG-7330 (produced by Toyo Ink Manufacturing Co. Ltd.) | 5 |

That is, 10 g of the components shown in Tables 1 and 2 are first mixed with 20 parts by weight of methylene chloride, and this mixture is mixed with 200 ml of water in which a boundary surface activator such as cation or nonion having an HLB value of at least 10 and 1 g of gelatin are dissolved, and this mixture is stirred under a temperature of 60° C. at 8,000–10,000 rpm by a homo-mixer and emulsified to thereby obtain oil drops of an average partice diameter of 26 μm.

The stirring is further continued under a temperature of 60 ° C. for 30 minutes and methylene chloride is removed to thereby provide an average particle diameter of about 10 μm. 20 ml of water in which 1 g of Arabian rubber is dissolved is added thereto, and $NH_4OH$ (ammonia) water is added to the mixture while the mixture is slowly cooled, to provide pH11 or greater and thereby obtain microcapsule slurry, and 1.0 ml of water solution of glutaraldehyde 20 % is slowly added thereto to harden the capsule wall.

Thereafter, the solid and liquid are separated by a nutche filter, and the liquid is dried at 35 ° C. for 10 hours by a vacuum drier to obtain microcapsule-like image forming nuclides.

These image forming nuclides are microcapasules in which the cores 1c and 1d of Tables 1 and 2 are covered with shells 1e, and are formed with a particle diameter of 7–15 μm, and an average particle diameter of 10 μm.

Describing this in greater detail, an attachment agent 1f comprising polyester adhesive agent Polyester LP-022 (solid content 50 %) produced by Nippon Gosei Kagaku Kogyo Co., Ltd., dissolved in toluene at a ratio of 1 cc to 3 cc is applied to a back-up member 1a comprising a polyethylene terephthalate film of a thickness of 6 μm. When the solvent was dried and removed thereafter and the thickness was measured, the thickness was about 1 μm. The glass transition point of this attachment agent 1f is −15° C. and therefore, even at the room temperature, there is left subtle tack in this agent and thus, it becomes possible to easily attach the image forming nuclides formed as previously described to the back-up member 1a.

The microcapsule-like image forming nuclides having as the core material the components shown in Tables 1 and 2 which were obtained as described above were then mixed at a ratio of 1:1, and were sprinkled over and adhesively secured to the back-up member. When any excess image forming nuclides were shaked off thereafter, the image forming nuclides were disposed substantially in one layer and at a rate of 90 % on the attachment layer.

Thereafter, a pressure of about 1 kg/cm$^2$ and heat energy of about 80° C. are imparted to firmly fix the image forming nuclides onto the back-up member 1a to thereby construct the transfer recording medium 1.

Figure 3:
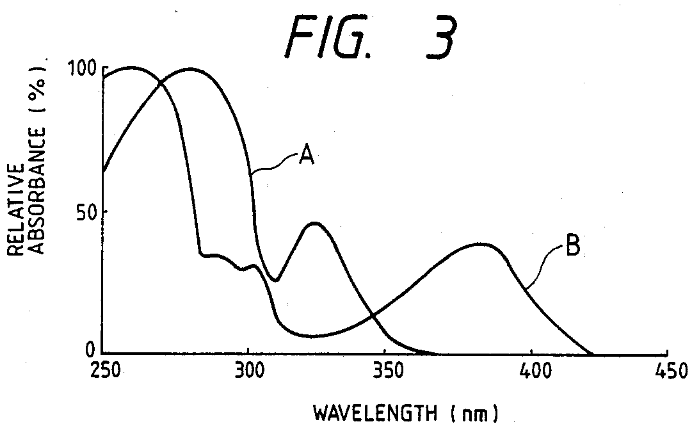
FIG. 3 is a graph showing the light absorbing characteristic of a light starting agent in the transfer recording medium.

The light starting agent in the image forming nuclides shown in table 1 above absorbs the light of the band of graph A in the light absorbing characteristic of FIG. 3 and starts reaction, and becomes magenta during image formation, and the light starting agent in the image forming nuclides shown in table 2 above absorbs the light of the band shown in the graph B of FIG. 3 and starts reaction, and becomes blue during image formation.

The heating means 14 will now be described. This heating means 14 is for imparting heat energy to the transfer recording medium 1, and comprises a heater 14a and an air fan 14b disposed upstream of a recording section 3 with respect to the direction of conveyance of the transfer recording medium 1, and a duct 14c. The heater 14a is comprised of a heat plate, and the surface temperature thereof reaches 80°–90° C. in several seconds after heating is started. A slit 14d is provided in the duct 14c, and the air heated by the heater 14a is blown against the transfer recording medium 1 near the recording section 3 by the air fan 14b, thereby heating the transfer recording medium 1.

Here, FIG. 1C is a perspective view of an embodiment of the heating means 14. As shown, a cylindrical duct 14c is provided around an elongate heat plate 14a. The air fan 14b is provided at one end of the duct 14c. The slit 14d is provided in that portion of the duct 14c which is opposed to the transfer recording medium 1. When electric power is supplied from a cord 14e, the heat plate 14a generates heat and the interior of the duct 14c is warmed up. By the rotation of the air fan 14 which starts to rotate substantially simultaneously with the supply of electric power to the heat plate 14e, the warm wind in the duct 14c passes through the duct 14d and is blown against the transfer recording medium 1. Accordingly, the transfer recording medium 1 is preliminarily heated by this warm wind.

The heating means 14 is controlled so as to operate when the temperature in the apparatus is 20° C. or lower and not to operate when the temperature in the apparatus exceeds 20° C., by in-the-apparatus temperature detecting means provided in the apparatus.

The recording section 3 will now be described. The recording section 3 is comprised of heating means for imparting heat energy providing first energy to the transfer recording medium 1, and light applying means for imparting light energy providing second energy to the transfer recording medium 1.

The heating means comprises a line type heat generation element array 3b for size A-4 of a width of 0.2 mm and 8 dots/mm generating heat in response to an image signal and arranged on the surface of the recording head 3a, and as previously described, the back-up member 1a side of the transfer recording medium 1 is adapted to be urged against the heat generation element array 3b with a predetermined pressure by the back tension during the conveyance thereof. The image signal is produced from a control unit such as a facsimile apparatus, an image scanner or an electronic blackboard in conformity with use or with the kind of the image recording apparatus applied.

Figure 4:
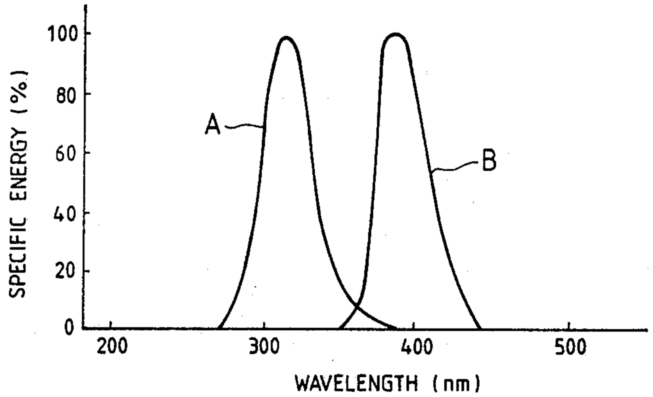
FIG. 4 is a graph showing the spectral characteristic of light applying means.

On the other hand, at the transfer recording layer 1b side opposed to the recording head 3a, two fluorescent lamps 3c and 3d which are 20 W type light applying means having a spectral characteristic as shown in FIG. 4 are disposed at a distance of about 15–35 mm from the transfer recording medium 1.

Further, a slit plate 3e is provided at a distance of about 0.5 mm from the transfer recording medium 1 in such a manner that the width of the opening thereof is 1.2 mm, so that the direct lights of the fluorescent lamps 3c and 3d may be applied only to that area of the transfer recording medium 1 urged against the recording head 3a which is immediately above the heat generation element array.

In the present embodiment, 20 W fluorescent lamp FL20SE for health radiation produced by Toshiba Co., Ltd. is used as one fluorescent lamp 3c having the spectral characteristic shown in the graph A of FIG. 4, and 20 W fluorescent lamp FL10A70E39 produced by Toshiba Co., Ltd. is used as the other fluorescent lamp 3d having the spectral characteristic shown in the graph B of FIG. 4.

The transfer section 4 will now be described. The transfer section 4 is comprised of a transfer roller 4*a* disposed downstream of the recording section 3 with respect to the direction of conveyance of the transfer recording medium 1 and rotatively driven in the direction of arrow b as shown in FIG. 1, and a pressing roller 4*b* urged against the transfer roller 4*a*.

The transfer roller 4*a* is constructed of an aluminum roller having its surface covered with silicone rubber having a thickness of 1 mm and a hardness of 70 degrees, and is designed such that the surface thereof is maintained at 90°-100° C. by a halogen heater 4*c* of 800 W contained therein.

The pressing roller 4*b* comprises an aluminum roller having its surface covered with silicone rubber having a thickness of 1 mm and a hardness of 70° C., and its pressure force with respect to the transfer roller 4*a* is set to 6-7 kgf/cm by pressing means (not shown) such as a spring.

Further, recording sheets 8 which are recording mediums piled in a cassette 7 may be fed one by one by a feed roller 9 and a pair of register rollers 10*a* and 10*b*, and the leading end of the recording sheet 8 may be detected by a register sensor 26 comprising an LED 26*a* and a phototransistor 26*b*, and by controlling the feed timing, the recording sheet may be synchronously fed to the transfer section 4 so as to overlap the image area of the transfer recording medium 1.

Description will now be made of a case where recording is effected by the use of the recording apparatus constructed as described above.

In the present embodiment, there is shown an example in which heat is imparted in conformity with an image signal and light is uniformly imparted.

A motor is driven to pay away the transfer recording medium 1 from the supply roll 2, and when in the recording section 3, light and heat are imparted to the transfer recording layer 1*b* of the transfer recording medium 1 in conformity with an image signal, there is formed an image. If at this time, the temperature in the apparatus exceeds 20° C., the heating means 14 does not operate, whereas if the temperature in the apparatus is 20° C. or lower, the heating means 14 operates and warm wind is blown against the transfer recording medium 1, whereby the transfer recording medium 1 is preliminarily heated, and then image formation is effected in the recording section 3.

Figure 5:
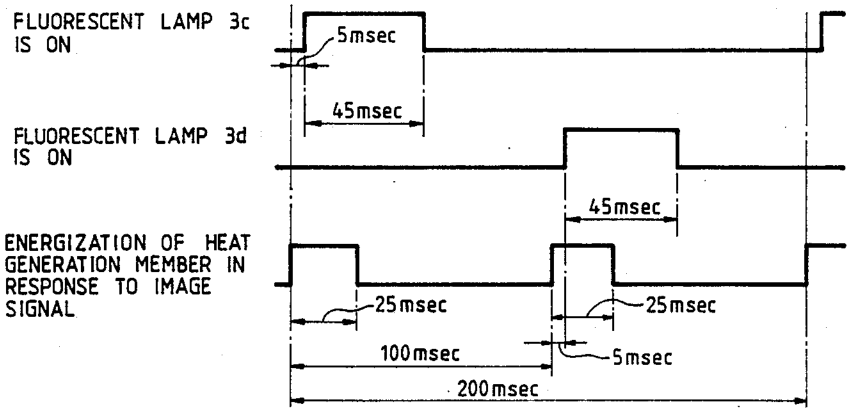
FIG. 5 is a timing chart showing the timing at which heat and light are imparted.

The transfer recording layer 1*b* has the property that when a light of a predetermined wavelength and heat are imparted thereto, the softening point temperature thereof rises, that is, the transfer characteristic thereof is irreversibly varied and the image thereon is not transferred to the recording sheet 8. Accordingly, as shown in the timing chart of FIG. 5, during magenta recording, no electric power is supplied to the heat generation element in the heat generation element array 3*b* which corresponds to the magenta of the image signal, but electric power supply for 25 ms is effected to the portion which corresponds to the white of the image signal (the recording sheets 8 are white), and the light of the fluorescent lamp 3*c* is uniformly applied with a delay of 5 ms. The application time in this case is 45 ms.

Next, during the recording of blue, after 50 ms has elapsed after the termination of said light application, that is, in 100 ms after said power supply starting time, no electric power is supplied to the heat generation element in the heat generation element array 3*b* which corresponds to the blue of the image signal, but electric power supply for 25 ms is effected to the portion which corresponds to the white of the image signal, and in 5 ms thereafter, the light of the fluorescent lamp 3*d* is uniformly applied. The application time in this case is also 45 ms.

In the manner as described above, the recording head 3*a* is controlled in conformity with the blue, magenta and white image signals to form a negative image on the transfer recording layer 1*b*, and the transfer recording medium 1 is synchronously conveyed at a repetition period of 200 ms/line.

In the manner described previously, a transfer image (a latent image) is formed on the transfer recording medium 1, and during the image formation in the recording section 3, it is preferable to keep the transfer recording medium 1 at a predetermined temperature by the heating means 14 as previously described. This is because for example, a monomer having unsaturation double bond, an oligomer or a polymer and a light polymerization starting agent are contained in the transfer recording layer 1*b* and therefore, it is preferable to keep the mutual solubility of said monomer and said oligomer or said polymer and said light polymerization starting agent in a predetermined state, irrespective of the environment in which the apparatus is used, and as a result, make the sensitivity of the transfer recording layer 1*b* to light energy and heat energy constant. Accordingly, if as in the present embodiment, the transfer recording medium 1 is kept at a predetermined temperature by the heating means 14, the mutual solubility of the transfer recording layer 1*b* becomes constant before the image formation, and the image formation in the recording section 3 thereafter is stably effected.

Figure 6:
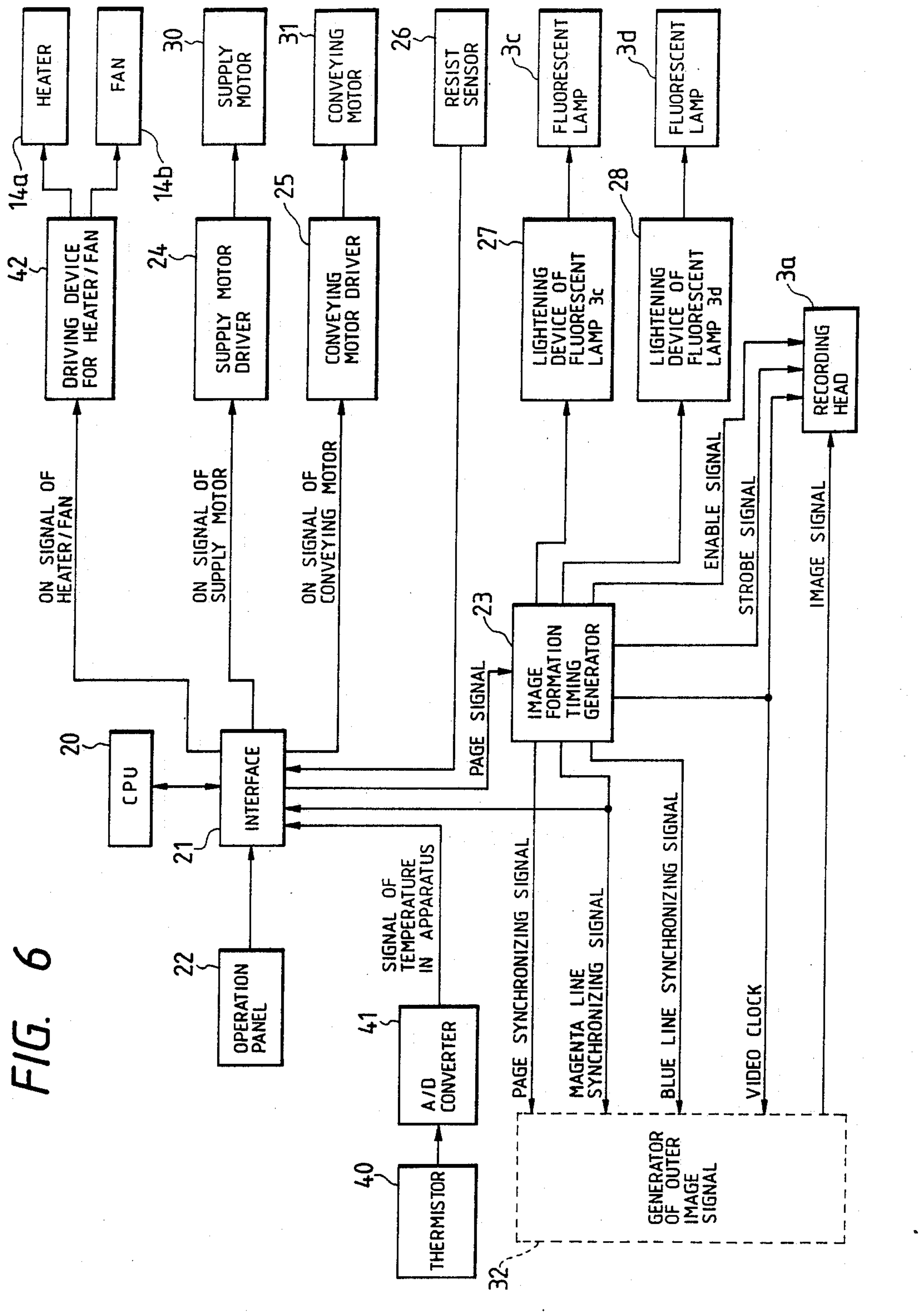
FIG. 6 is a block diagram of a control system.
Figure 7:
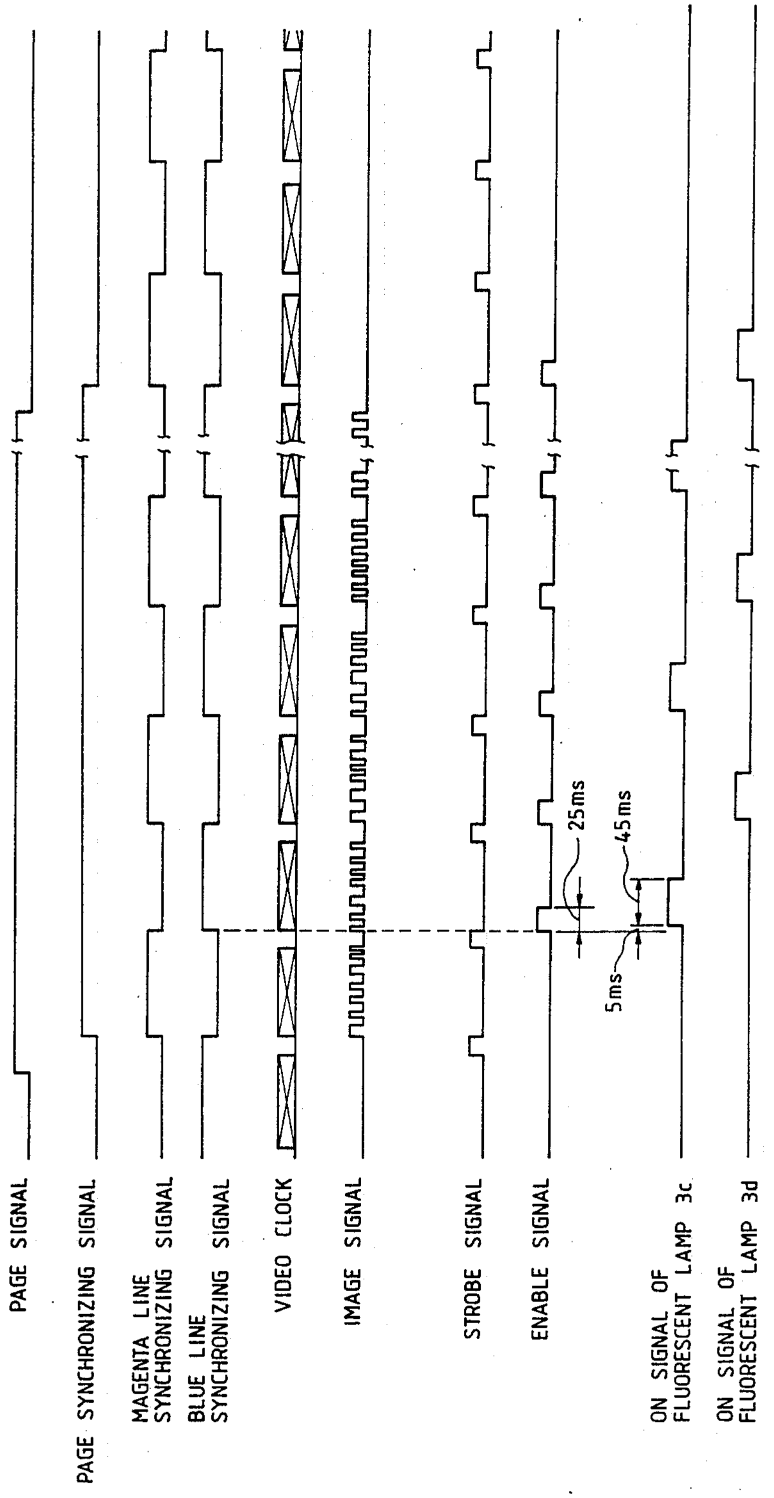
FIGS. 7 and 8 are timing charts of the recording operation.
Figure 8:
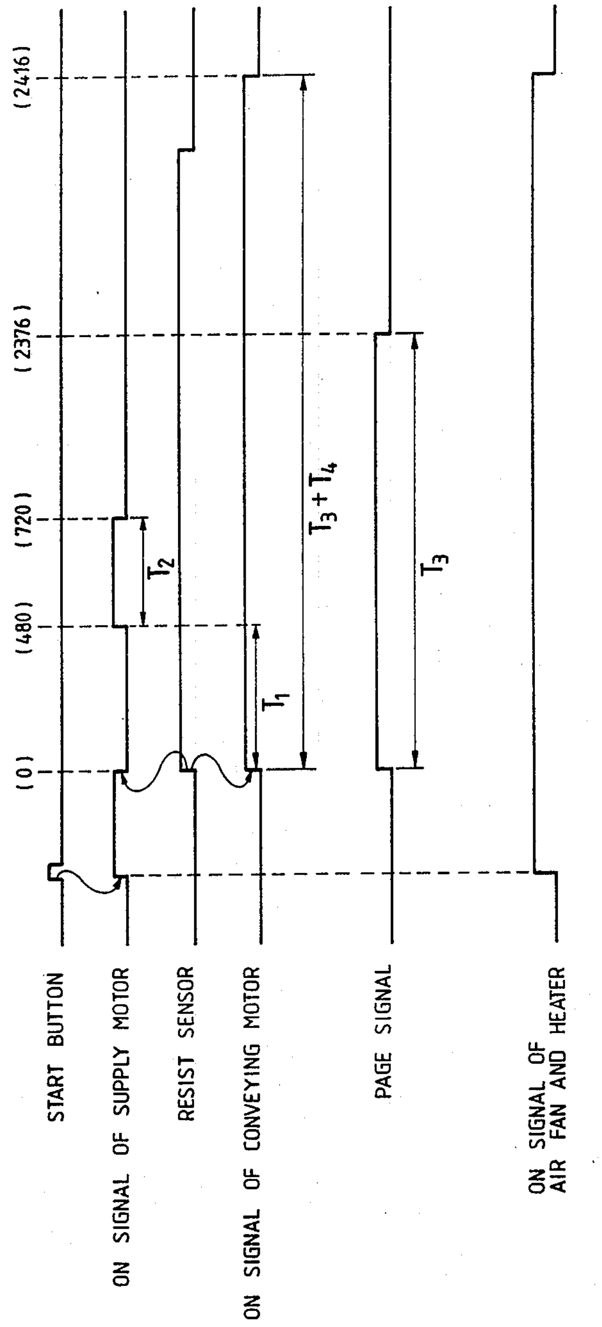
Figure 9:
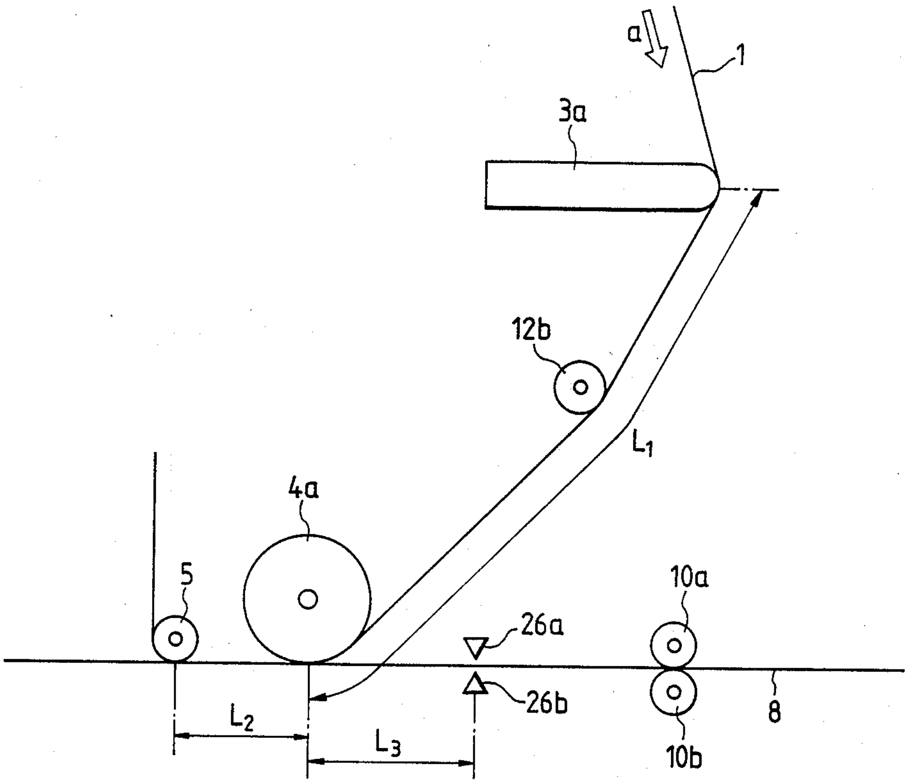
FIG. 9 illustrates the relations between various members.
Figure 12:
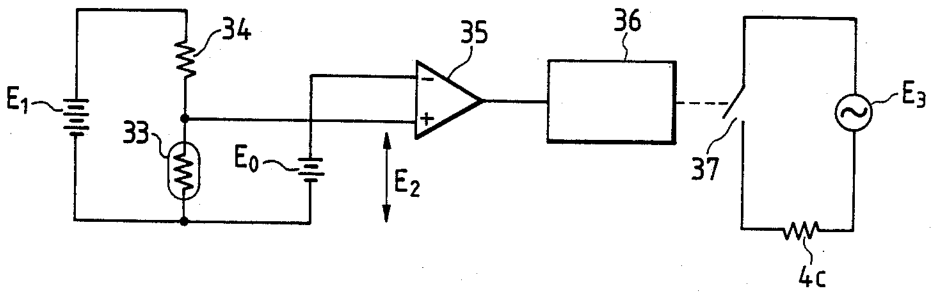
Figure 10:
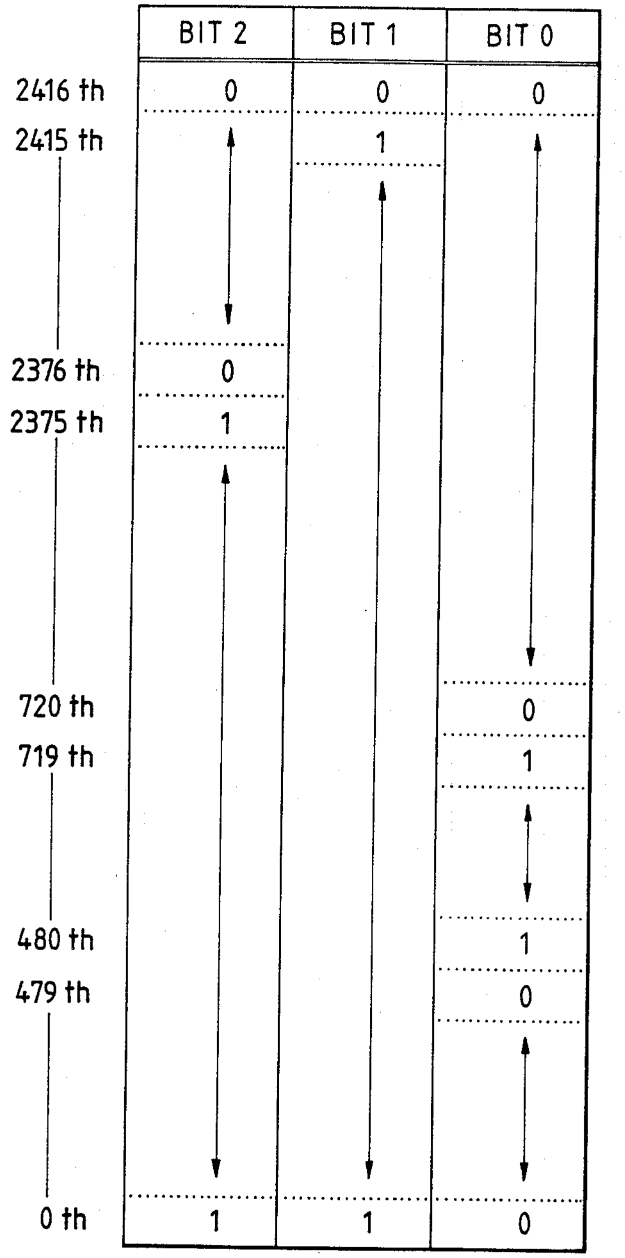
FIG. 10 illustrates a sequence table for effecting the delivery of various signals.
Figure 11:
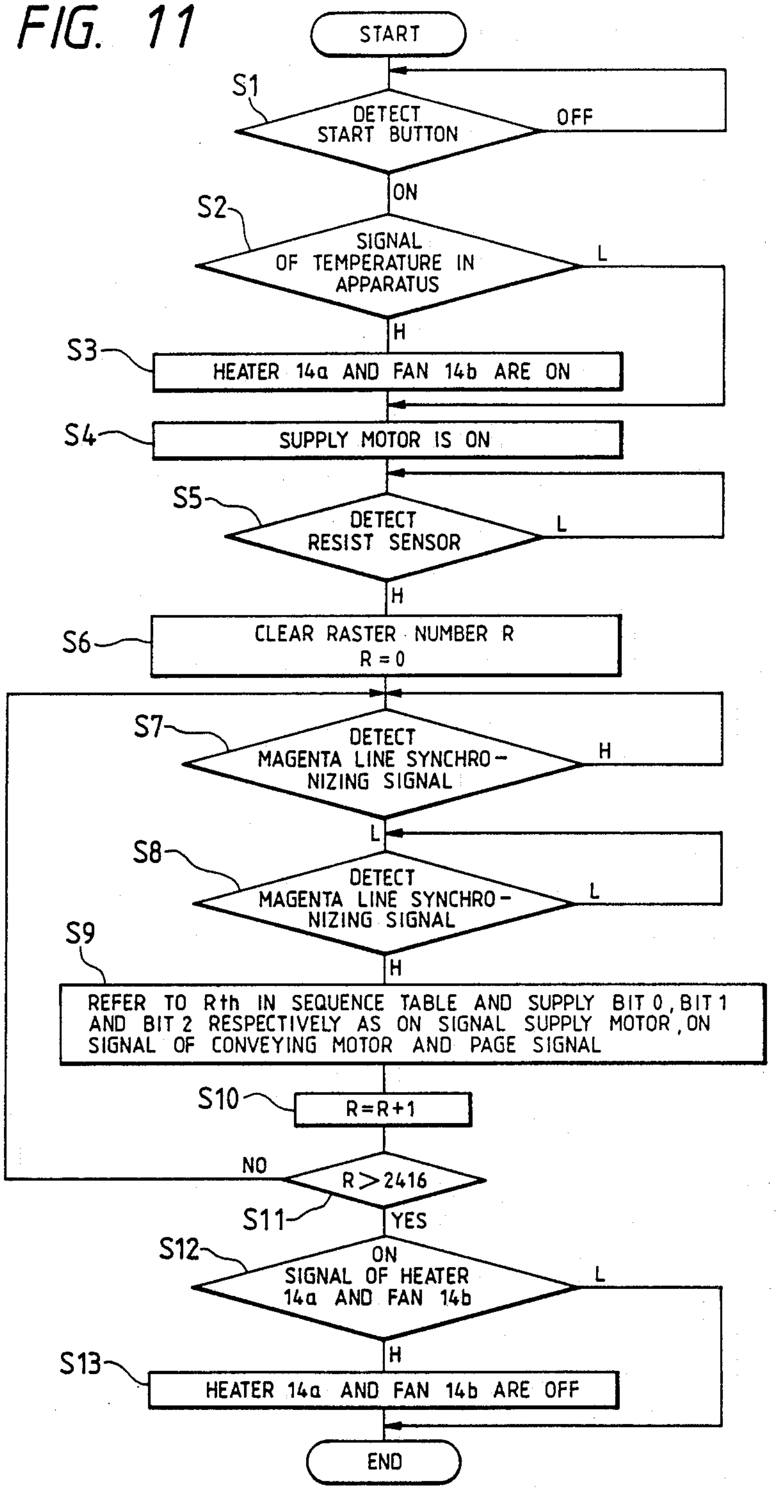
FIG. 11 is a flow chart of the recording operation.

Here, a control system according to the present embodiment for effecting the above-described recording operation will be specifically described with reference to FIGS. 6 to 12. FIG. 6 is a block diagram of the control system, FIGS. 7 and 8 are timing charts of the recording operation, FIG. 9 shows the relations between the various members, FIG. 10 is a sequence table for effecting the delivery of various signals, FIG. 11 is a flow chart of the recording operation, and FIG. 12 is a block diagram of a temperature control system for the transfer roller 4*a*.

This control system, as shown in FIG. 6, comprises a CPU 20, an interface 21, an operation panel 22, an image formation timing generator 23, a supply motor driver 24, a conveying motor driver 25, a resist sensor 26 and lightening devices 27 and 28 of the respective fluorescent lamps.

The CPU 20 receives as inputs through the interface 21 various kinds of information from the operation panel 22 (for example, the recording density, the number of recording sheets, the record size, etc.), the signal from the resist sensor 26, and the magenta synchronizing signal produced by the image formation timing generator 23, and further the in-the-apparatus temperature signal from a temperature detector 40 comprising a thermistor provided in the apparatus through an A/D converter 41. Also, the CPU 20 produces the motor ON signal of a supply motor 30, the motor ON signal of a conveying motor 31 a page signal, and the ON signals of the heater 14*a* and fan 14*b* of the heating means 14 through the interface 21.

The image formation timing generator 23 frequency-divides the clock of a crystal oscillator therein and produces various signals (a magenta line synchronizing signal, a blue line synchronizing signal, a page synchronizing signal, a video clock, an enable signal, a strobe signal, fluorescent lamp ON signals, etc.).

The magenta line synchronizing signal and the blue line synchronizing signal, as shown in FIG. 7, are signals in which the duty ratio is 50 % at a period of 200 ms and which are 180° C. out of phase with each other. The page signal delivered from the CPU 20 through the interface 21 is latched by the rising edge of the magenta line synchronizing signal to thereby produce a page synchronizing signal.

The video clock is a signal which produces a clock of 25 KHz from the rising of the magenta and blue line synchronizing signals and pauses after it has produced 1728 (about 69 ms) clocks. (The recording head 3*a* in the present embodiment has 1728 picture elements per line).

A generator 32 of outer image signal (such as, for example, a facsimile apparatus, an image scanner or an electronic blackboard) receives the page synchronizing signal, the magenta and blue line synchronizing signals and the video clock from the image formation timing generator 23, and delivers 1728 magenta image signals in synchronism with the video clock when the magenta line synchronizing signal is "high" from the point of time at which the page synchronizing signal has become "high", and delivers 1728 blue image signals in synchronism with the video clock when the blue line synchronizing signal is "high"

It further produces a strobe signal which becomes high during the period for which said magenta and blue line synchronizing signals are "high" and the video clock pauses.

The enable signal repeates "high" for 25 ms from the rising edge of the magenta and blue line synchronizing signals, and is terminated by the production of "high" for 25 ms within the "high" period of the first magenta line synchronizing signal during which the page synchronizing signal has become "low". This enable signal corresponds to the power supply signal to the heat generation element 3*b* which corresponds to the image signal of FIG. 5.

Further, the image formation timing generator 23 produces the ON signals of the fluorescent lamps. The ON signal of the fluorescent lamp 3*c* is a signal which becomes "high" with a delay of 5 ms from the first rising of the enable signal and becomes "low" in 45 ms thereafter, and this signal is repetitively produced for every other enable signal. The ON signal of the fluorescent lamp 3*d* is likewise produced with a delay of 100 ms relative to the ON signal of the fluorescent lamp 3*c*.

The recording head 3*a* and the fluorescent lamps 3*c* and 3*d* are driven by said signals, and the recording head 3*a* introduces the image signal from the generator 32 of outer image signal into a shift register in the head by the video clock from the image formation timing generator 23. The thus introduced image signal is latched in a latch register in the head by the strobe signal from the image formation timing generator 23, whereafter electric power supply is effected to the heat generation element 3*b* by the enable signal from the image formation timing generator 23 in conformity with the image signal in the latch register, and simultaneously with said electric power supply, the next image signal is introduced into the shift register by the video clock.

The lightening devices 27 and 28 of the fluorescent lamps 3*c* and 3*d* receive the ON signals of the fluorescent lamps 3*c* and 3*d* from the image formation timing generator 23, and turn on the corresponding fluorescent lamps 3*c* and 3*d* at a point of time whereat the ON signals of the respective fluorescent lamps 3*c* and 3*d* are "high".

By the above-described control, a transfer image is formed on the transfer recording medium 1.

In the aforedescribed image formation, the temperature in the apparatus is always detected by a thermistor 40, and when the in-the-apparatus temperature signal is "high" (when the temperature in the apparatus is 20° C. or lower), the CPU 20 delivers the heater/fan ON signal, and when the in-the-apparatus temperature signal is "low" (when the temperature in the apparatus exceeds 20° C.), the CPU 20 does not deliver said signal (the heater/fan ON signal of FIG. 8 is an example when the temperature in the apparatus is 20° C. or lower). That is, when the temperature in the apparatus is 20° C. or lower, said heater/fan ON signal is delivered and the heater 14*a* and the fan 14*b* are driven through a heater/fan driving device 42. Thereby the transfer recording medium 1 conveyed to the recording section 3 is heated to a predetermined temperature and thus, the image formation in the recording section 3 is effected stably.

Description will now be made of the control of the conveyance of the transfer recording medium 1 and the recording sheet 8 for transferring the transfer image formed on the transfer recording medium 1 to the recording sheet 8.

When the ON signal of the supply motor from the CPU 20 through the interface 21 is "high", the supply motor driver 24 drives the supply motor 30 to thereby rotate the feed roller 9 and the pair of register rollers 10*a* and 10*b* and convey the recording sheet 8 at a predetermined speed.

When the ON signal of the conveying motor also from the CPU 20 through the interface 21 is "high", the conveying motor driver 25 drives the conveying motor 31 to thereby rotate the transfer roller 4*a*, and the transfer recording medium 1 and the recording sheet 8 are conveyed at a predetermined speed by the cooperation between the transfer roller 4*a* and the pressing roller 4*b* which follows the rotation of the transfer roller.

The timing of each signal input and output by the CPU 20 through the interface 21 is as shown in FIG. 8. The times $T_1$–$T_2$ in FIG. 8 are the times required for the transfer recording medium 1 or the recording sheet 8 to be conveyed as follows when the distances between the various members are $L_1$–$L_3$ as shown in FIG. 9.

- $L_1$: the distance of conveyance of the transfer recording medium 1 from the recording head 3*a* to the portion of pressure contact between the transfer roller 4*a* and the pressing roller 4*b*
- $L_2$: the distance of conveyance of the transfer recording medium 1 from said portion of pressure contact to the peeling-off roller 5
- $L_3$: the distance of conveyance of the recording sheet 8 from the resist sensor 26 to said portion of pressure contact
- $T_1$: the time required for the transfer recording medium 1 to be conveyed by the distance $L_1$–$L_3$
- $T_2$: the time required for the recording sheet 8 to be conveyed by the distance $L_3$
- $T_3$: the time required for the transfer recording medium 1 to be conveyed by an amount corresponding to the length of the recording sheet 8 (e.g. 297 mm in the case of size A4)
- $T_4$: the time required for the transfer recording medium 1 to be conveyed by the distance $L_1+L_2$ That is, when the operator depresses a start button on the operation panel 22, the supply motor 30 is driven to supply the recording sheet 8, and the driving is stopped at a point of time whereat the leading end edge of the recording sheet has come to the resist sensor 26. Simultaneously with this stoppage of the driving, the conveying motor 31 is driven to convey the transfer recording medium 1 in the direction of arrow a in FIG. 1 and the page signal becomes "high" for the time $T_3$, and the transfer image formation process is carried out in the recording section 3.

The conveying motor 31 is stopped after the time $T_4$ further elapses after the lapse of said image formation time $T_3$.

The supply motor 30 is driven for the time $T_2$ after the time $T_1$ has elapsed from the start of the conveyance of the transfer recording medium 1, to thereby convey the recording sheet 8 at the same speed as the transfer recording medium 1, and then is stopped. Thus, the leading end edge of the recording sheet 8 coincides with the leading end of the transfer image formed on the transfer recording medium 1 in the transfer section 4, and the recording sheet 8 is conveyed by the drive of the conveying motor 31 while keeping intimate contact with the transfer recording medium 1.

Here, the operation of the CPU 20 which delivers the various signals as shown in FIG. 8 will be described The CPU 20 receives as an input the magenta line synchronizing signal through the interface 21, and counts it by a software counter. That is, the magenta line synchronizing signal is of 200 ms period as previously mentioned and therefore, by the CPU 20 counting said signal, the time can be controlled.

The CPU 20 has therein a sequence table as shown in FIG. 10, and refers to the sequence table in succession while counting the magenta line synchronizing signal after the resist sensor signal becomes "high", and delivers the ON signal of the supply motor, the ON signal of the conveying motor and the page signal and controls the driving of the respective members by the respective signals.

In the present embodiment, the sequence table is of 3-bit construction as shown in FIG. 10, and comprises total 2417 words from the 0th to the 2416th word, and the bit 0 corresponds to the ON signal of the supply motor, the bit 1 corresponds to the ON signal of the conveying motor, and the bit 2 corresponds to the page signal Also, the numerals in the parentheses at the top of FIG. 8 indicate the numbers of the magenta line synchronizing signals (the number of the signals) at the respective points of time when the magenta line synchronizing signal at the point of time whereat the resist sensor signal has become "high" is the 0th.

A series of operations of the CPU 20 having the aforedescribed functions will now be described with reference to the flow chart of FIG. 11. First, whether the start button on the operation panel has been depressed is detected (S1), and if the start button has been depressed, whether the signal of temperature in apparatus is "high" is detected, and when said signal is "high", the ON signal of the heater 14*a* and the fan 14*b* is delivered and the ON signal of the supply motor is delivered (S2, S3 and S4). When said signal of temperature in apparatus is "low", only the ON signal of the supply motor is delivered. Next, waiting for the resist sensor signal becoming "high" (S5), 0 is substituted into R which is indicative of the raster number of the sequence table (S6). Next, the magenta line synchronizing signal becoming "low" is waited for (S7), whereafter said signal becoming "high" is waited for (S8). Thereby the rising edge of the magenta line synchronizing signal is detected When said edge is detected, reference is made to the Rth of the sequence table, and bits 0–2 are delivered as the ON signal of the supply motor, the ON signal of the conveying motor and the page signal, respectively (S9). Subsequently, 1 is added to the value of said R (S10), and whether the value of said R is greater than 2416 is determined (S11), and if the value of said R is smaller than or equal to said 2416, return is made to step S7 to continue recording, and if the value of said R is greater than said 2416, whether the ON signal of the heater 14*a* and fan 14*b* is "high" is detected (S12), and if said ON signal is "high", the heater 14*a* and fan 14*b* are switched off (S13) to terminate recording.

The image formed in the manner described previously is heated and transferred to the recording sheet 8 in the transfer section 4, and the temperature control of the transfer roller 4*a* is designed as shown in FIG. 12.

The thermistor 33 of FIG. 12 is disposed in the apparatus so as to contact with the surface of the transfer roller 4*a*, and the resistance value thereof varies in conformity with the surface temperature of the transfer roller 4*a*, and this resistance value is converted into a voltage $E_2$ by a voltage source $E_1$ and a resistor 34, and the voltage $E_2$ is compared with a reference volta $E_0$ by a comparator 35. The comparison output controls the electric power supply from a power source $E_3$ to the halogen heater 4*c* by a relay 37 through a relay driver 36.

Here, the principle of the driving of the above-described temperature control construction will be described. The thermistor 33 has the property that the resistance value thereof becomes smaller as the temperature rises, and consequently, if the surface temperature of the transfer roller 4*a* rises, the resistance value of the thermistor 33 falls and the voltage $E_2$ drops Conversely, if the surface temperature of the transfer roller 4*a* falls, the resistance value of the thermistor 33 rises and the voltage $E_2$ also rises. Accordingly, by setting the value of the reference voltage $E_0$ to the value of the voltage $E_2$ at which the transfer roller 4*a* corresponds to 95° C., when the surface temperature of the transfer roller 4*a* is lower than 95 ° C., the comparison output becomes "high" and electric power is supplied to the halogen heater 4*c* and thus, the surface temperature of the transfer roller 4*a* rises Conversely, when the surface temperature of the transfer roller 4*a* is higher than 95° C., no electric power is supplied to the halogen heater 4*c* and the surface temperature falls. By the aforedescribed control, the surface temperature of the transfer roller 4*a* is held at 90°–100° C. This control system is constantly operating when the main switch of the apparatus is closed, and the surface temperature of the transfer roller 4*a* is controlled so as to become 90°–100° C. before the start button on the operation panel (not shown) is depressed.

While the foregoing description is of the temperature control of the halogen heater 4*c* in the transfer section 4, the temperature control for driving the heating means 14 is also identical in principle.

In the manner described above, an image is formed on the transfer recording medium 1, and this image is transferred as an image of two colors, magenta and blue, to the recording sheet 8 in the transfer section 4, and thus, recording as a visualized image is effected on the record sheet 8.

Thereafter, the recording sheet 8 is peeled off from the transfer recording medium 1 by the peeling-off roller 5, and the recording sheet 8 on which recording of an image of desired colors has been effected is discharged onto a discharge tray 11 by a pair of discharge rollers 13*a* and 13*b*.

In the manner described above, recording of two colors is accomplished in one shot.

(Further Embodiments)

Description will now be made of further embodiments of the various portions in the previously described embodiment.

(1) Transfer Recording Medium

The previous embodiment has been described with respect to an example of two-color recording, but as the applicant made clear in Japanese Patent Application No. 61-128814, the kinds of the coloring agent and light starting agent constituting the image forming nuclides are suitably chosen and a light source of a wavelength which causes said light starting agent to react is chosen, and the process according to said patent application is used, whereby a recorded image of a single color, or three or more colors, or full color can also be obtained.

Further, in the previous embodiment, there has been shown an example in which the softening point temperature of the transfer recording layer 1*b* of a high molecular material containing a coloring agent is varied by light energy and heat energy, whereby the image is transfer-recorded on the recording sheet 8, but alternatively, the image may be transfer-recorded by the utilization of the difference in the adhesion characteristic with respect to the recording sheet or in the sublimation characteristic. As a further alternative, the recording sheet 8 may be endowed with a color forming property and such a layer which will vary the color forming characteristic of the recording sheet 8 may be provided on the transfer recording medium 1, and the image formed on the transfer recording medium 1 may be transferred to the recording sheet 8 to thereby obtain an image.

The first energy and the second energy imparted to the transfer recording layer 1*b* are not limited to the aforementioned heat energy and light energy, but an image may be formed by the use of other energy such as, for example, pressure energy.

The material of the back-up member 1*a* is not limited to the aforementioned polyethylene terephthalate, but may also be, for example, polyamide, polyimide, condenser paper, cellophane paper or the like.

Also, the transfer recording layer 1*b* may be any transfer recording layer as long as its property of matter can be varied by a plurality of kinds of energy to thereby form a transfer image. For example, if use is made of a transfer recording layer having its properties of matter such as melting temperature, softening point, glass transition point and viscosity variable by a plurality of kinds of energy being imparted thereto, a transfer image can be formed.

A responsive component and a coloring component are contained in the image forming nuclides forming the transfer recording layer 1*b*, and it is preferable that a substance in which the response of the variation in the properties of matter starts when a plurality of kinds of energy such as light energy and heat energy are imparted thereto or a substance in which the reaction speed of the variation in the properties of matter changes suddenly be used as the responsive component.

As the high molecular component contained in said responsive component, mention may be made of a component which causes polymerization reaction or bridge response, such as, for example, monomer, oligomer or polymer.

As said monomer or said oligomer, mention may be made, for example, of polyvinyl cinnamate, p-methoxycinnamic-succinic acid hemiester or a material having a reactive group at its distal end or at its side chain, such as epoxy resin or unsaturated polyester resin.

As the polymeric monomer, mention may be made, for example, of ethylene glycol diacrylate, propylene glycol diacrylate or the like.

Where said polymeric monomer or oligomer is used, cellulose acetate succinate, methyl methacrylate-hydroxyethyl methane relate copolymer or the like may be contained therein to improve the layer forming property thereof as well.

In order to cause the reaction of the high molecule component, a reaction starting agent is added as required. As the reaction starting agent, a radical starting agent such as, for example, an azo-compound, an organic sulfur compound, a calginyl compound or a halogen compound is preferable.

Also, particularly for the construction of the transfer recording layer when both of light energy and heat energy are received to form a transfer image, the kinds of the reaction starting agent and the high molecular component may be chosen so that a combination great in the temperature dependency of the reaction speed may be provided by the reaction between the reaction starting agent acting upon receipt of said light energy and the high molecular component.

Mention may be made, for example, a combination of a polymeric prepolymer having a functional group such as a copolymer of methacrylate ester or acrylate ester, a photosensitive bridging agent such as tetraethylene glycol diacrylate, and a reaction starting agent such as benzophenone or mikelers ketone.

The coloring component is a component contained to form an optically recognizable image, and one of various pigments or dyes is suitably used. As an example of such pigments or dyes, mention may be made of an inorganic pigment such as carbon black or lead yellow, an organic pigment such as Victoria blue lake or fast sky blue, and a coloring agent such as leuco-dye or phthalocyanine dye.

A stabilizing agent such as hydroquinone or p-methoxyphenol may be contained in the transfer recording layer 1*b*.

Further, a sensitizer such as p-nitroaniline or 1,2-benzoanthraquinone for enhancing the activation of the reaction starting agent to energy may be contained in the transfer recording layer.

In addition to the coloring agent and the responsive component, resin, wax or liquid crystal as a binder may be mixed with the transfer recording layer 1*b*.

As the resin used as said binder, mention may be made, for example, of polyester resin, polyamide resion or the like, and one or more of these may be mixed for use.

Also, as the binder such as wax, use may be made, for example, vegetable wax such as candlira wax or carnauba wax, animal wax such as whale wax, mineral wax such as montan wax, or synthetic wax consisting of fatty acid and fatty acid amide, ester or the like, and further, one or more of said waxes may be mixed for use.

As the liquid crystal used as the binder, mention may be made of cholesterol hexanoate or cholesterol decanoate.

Where a microcapsule is used for the image forming nuclides constituting the transfer recording layer 1b, the aforementioned material is contained in the core portion thereof, and as the material used for the wall material of the microcapsule, mention may be made of a cellulose material such as gelatine, arabian rubber, nitrocellulose or ethylcellulose, or a polymer material such as polyethylene or polystyrene.

(2) Recording Section

The aforedescribed embodiment is of a construction in which, in the recording section 3, a light of a predetermined wavelength corresponding to a desired color is uniformly applied from the transfer recording layer 1b side of the transfer recording medium 1 an heat corresponding to the image signal is applied from the back-up member 1a side, but as another embodiment, a construction may be adopted in which heat is uniformly applied and a predetermined light is applied in conformity with the image signal.

Also, if the back-up member 1a is formed of a light-transmitting material, a construction may be adopted in which a light is applied from the back-up member 1a side and heat is applied from the transfer recording layer 1b side.

Further, in the aforedescribed embodiment, the application of light and the application of heat are effected at the opposite sides of the back-up member 1a, but discretely therefrom, both of the application of light and the application of heat may be effected from one side of the back-up member 1a to thereby achieve image formation.

Also, as the heating means, besides the aforedescribed method using the recording head 3a use may be made of a method using a YAG laser and a polygon mirror to selectively effect heating.

As the light applying means, besides the aforedescribed method using the fluorescent lamps 3c and 3d, use may be made, for example, of a method using an LED array, or a method using a xenon lamp and a filter matching the light absorbing characteristic of the material.

Further, in the aforedescribed embodiment, design is made such that light energy and heat energy are imparted to the transfer recording layer 1b at a time, but alternatively, design may be made such that light energy and heat energy are imparted discretely from each other with a result that the both kinds of energy are imparted (3) Transfer Section The transfer section is not restricted to the roller-like construction such as the transfer roller 4a and the pressing roller 4b, but may be of any construction capable of providing a desired pressure such as, for example, a rotatable belt or the like.

Also, as required, fixating means for fixating the image on the recording medium transferred thereto in the transfer section 4 may be provided downstream of the peeling-off roller 5 with respect to the direction of conveyance of the recording medium.

(4) Recording Medium

The recording medium is not limited to the aforedescribed recording sheets, but may as a matter of course be, for example, plastic sheets or the like for overhead projection (OHP).

(5) Heating Means

In the aforedescribed embodiment, as the heating means 14, warm air is blown against the transfer recording medium 1, but alternatively, for example, a heat plate, a heating bar, a heating roller or the like may be brought into contact with the transfer recording medium 1 immediately before the recording section 3 to thereby impart heat energy to the transfer recording medium 1.

Also, in the aforedescribed embodiment, the transfer recording medium 1 is heated only when the temperature in the apparatus is 20° C. or lower, but this temperature is suitably determined by the characteristic of the transfer recording medium 1 and of course, it need not be limited to said 20° C.

In the present invention, the heating means may be operated when not only the temperature in the apparatus, but also the temperature of the environment in which the apparatus is used (the atmospheric temperature) is within a predetermined temperature range. In such case, a temperature detecting sensor for detecting the temperature may be provided, for example, outside of the apparatus. Also, in the present invention, a humidity detecting sensor for detecting the humidity may be provided instead of the temperature detecting sensor so that when the environment in which the apparatus is installed is of high humidity, the heating means may be operated to thereby heat and dry the transfer recording medium. In such case, image recording of high quality can be accomplished without being affected by humidity. Accordingly, in the present invention, the heating means can be controlled with only one or both of the temperature information and the humidity information being taken into consideration.

In the present invention, as described above, the formation of an image on the transfer recording medium and the transfer of this image to the recording medium are effected successively and therefore, recording of images even on a recording medium having a relatively low degree of surface smoothness can be accomplished well. Also, where the present invention is applied to polychromatic recording, polychromatic image can be obtained without the recording medium being caused to effect complicated movement.

Also, the means for heating the transfer recording medium is provided upstream of the recording section, whereby images of high quality can always be obtained stably without depending on the environmental temperature.

We claim:

1. An image recording apparatus for effecting the recording of an image on a recording medium, having:

conveying means for conveying a transfer recording medium having a transfer recording layer whose transfer characteristic is varied by first energy and second energy differing from said first energy being imparted thereto;

a recording section having first energy imparting means for imparting said first energy to said transfer recording medium and second energy imparting means for imparting said second energy to said transfer recording medium, said first and said second energy imparting means being provided along the conveyance path of said transfer recording medium conveyed by said conveying means;

a transfer section for transferring an image formed on said transfer recording medium in said recording section to the recording medium; and heating means provided upstream of said recording section with respect to the direction of conveyance of said transfer recording medium for imparting heat energy to said transfer recording medium.

2. An image recording apparatus according to claim 1, wherein said first energy is heat and said second energy is light.

3. An image recording apparatus according to claim 1, wherein said heating means operates when the temperature of the environment in which said apparatus is used is within a predetermined temperature range.

4. An image recording apparatus according to claim 1, wherein said heating means operates when the temperature in said apparatus is within a predetermined temperature range.

5. An image recording apparatus according to claim 1, wherein said heating means has an air fan.

6. An image recording apparatus according to claim 1, wherein said heating means generates heat to thereby dry said transfer recording medium.

7. An image recording apparatus for recording an image on a recording medium, having:

conveying means for conveying a transfer recording medium having a transfer recording layer whose transfer characteristic is varied by one or more kinds of energy being imparted thereto;

a first image forming section provided along the conveyance path of said transfer recording medium conveyed by said conveying means for imparting said energy to said transfer recording medium to form an image on said transfer recording medium;

a second image forming section for forming on said recording medium a visualized image corresponding to the image formed on said transfer recording medium in said first image forming section; and heating means provided upstream of said first image forming section with respect to the direction of conveyance of said transfer recording medium conveyed by said conveying means for heating said transfer recording medium.

8. An image recording apparatus according to claim 7, wherein said energy is heat energy.

9. An image recording apparatus according to claim 7, wherein said energy is light energy.

10. An image recording apparatus according to claim 7, wherein in said second image forming section, pressure is applied with said transfer recording medium and said recording medium being in contact with each other.

* * * * *

UNITED STATES PATENT AND TRADEMARK OFFICE
CERTIFICATE OF CORRECTION

PATENT NO. : 4,952,944

DATED : August 28, 1990

INVENTOR(S) : TOSHIHARU INUI, ET AL.

It is certified that error appears in the above-identified patent and that said Letters Patent is hereby corrected as shown below:

COLUMN 2

Line 9,"Nov. 11, 1985)" should read --Nov. 11, 1985).--.
Line 36, "I" should read --It--.
Line 59, "embodiment" should read --an embodiment--.

COLUMN 4

TABLE 1, "Chiba Gaigee Co., Ltd.)" should read --Ciba Geigy Co., Ltd.)--.

COLUMN 5

Line 7, "partice diameter" should read --particle diameter.--.
Line 22, "microcapasules" should read --microcapsules--.
Line 54, "table 1" should read --Table 1--.
Line 58, "table 2" should read --Table 2--.

COLUMN 9

Line 28, ""high"" should read --"high".--.

COLUMN 10

Line 45, "times $T_1$-$T_2$" should read --times $T_1$-$T_4$--.

UNITED STATES PATENT AND TRADEMARK OFFICE

CERTIFICATE OF CORRECTION

PATENT NO. : 4,952,944

DATED : August 28, 1990

INVENTOR(S) : TOSHIHARU INUI, ET AL.

It is certified that error appears in the above-identified patent and that said Letters Patent is hereby corrected as shown below:

COLUMN 11

Line 27, "described" should read --described.--.
Line 48, "signal" should read --signal.--.

COLUMN 12

Line 29, "reference volta $E_0$" should read --reference voltage $E_0$--.
Line 40, "drops" should read --drops.--.
Line 50, "rises" should read --rises.--.

COLUMN 14

Line 18, "relate" should read --related--.
Line 37, "example, a" should read --example, of a--.
Line 62, "resion" should read --resin--.
Line 66, "example, vegetable" should read --example, of vegetable--.

UNITED STATES PATENT AND TRADEMARK OFFICE
CERTIFICATE OF CORRECTION

PATENT NO. : 4,952,944

DATED : August 28, 1990

INVENTOR(S) : TOSHIHARU INUI, ET AL.

It is certified that error appears in the above-identified patent and that said Letters Patent is hereby corrected as shown below:

COLUMN 15

Line 19, "an" should read --and--.
Line 39, "head 3a" should read --head 3a,--.
Line 54, "imparted" should read --imparted.--.

Signed and Sealed this

Thirty-first Day of March, 1992

Attest:

HARRY F. MANBECK, JR.

Attesting Officer

Commissioner of Patents and Trademarks